Patented Nov. 7, 1939

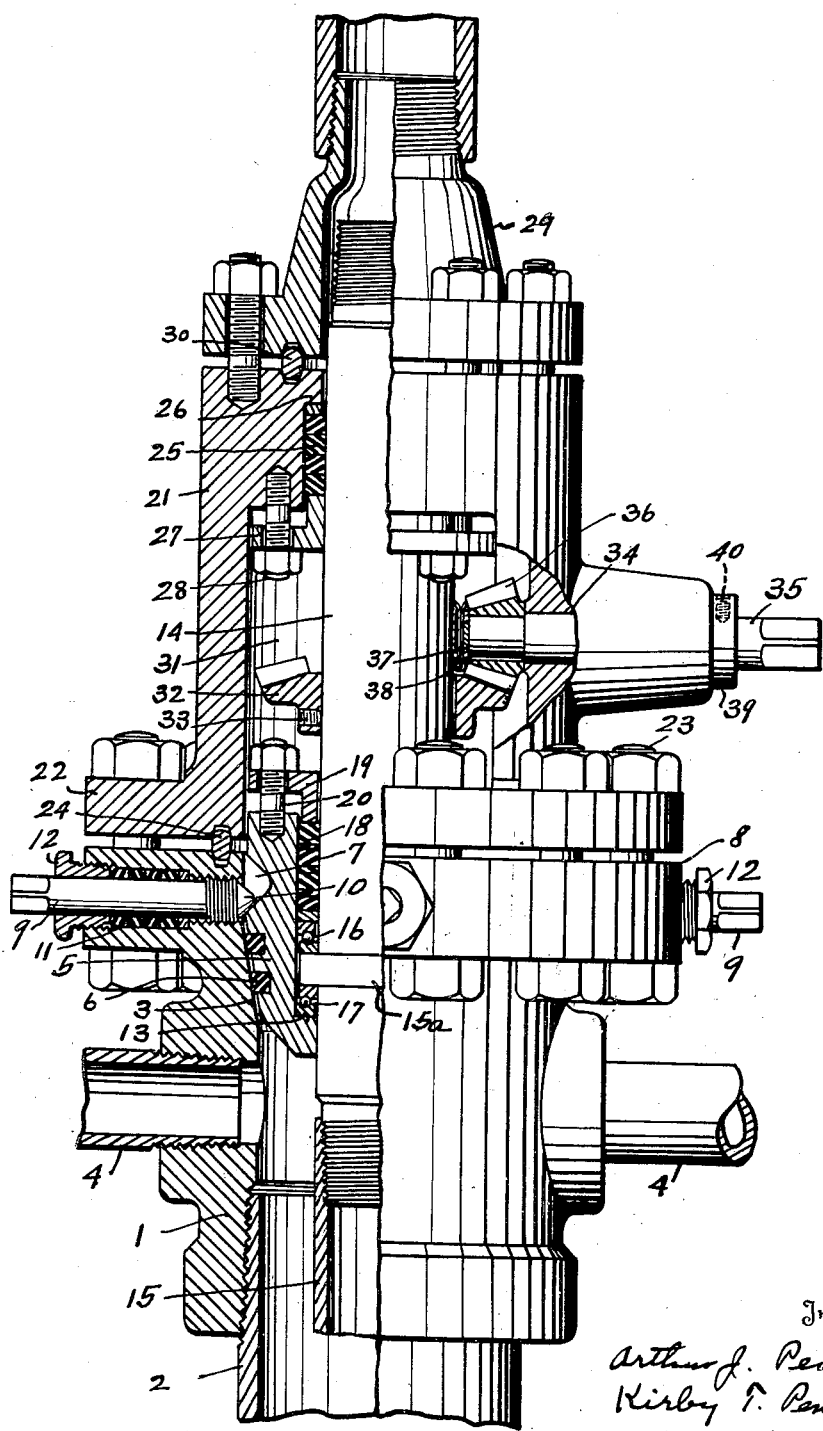

2,178,700

UNITED STATES PATENT OFFICE 2,178,700

TUBING HEAD

Arthur J. Penick and Kirby T. Penick,
Houston, Tex.

Application January 24, 1938, Serial No. 186,626

4 Claims. (Cl. 166—14)

This invention relates to a tubing head.

An object of the invention is to provide a tubing head for suspending a tubing in a well and embodying means whereby the tubing may be rotated to control the choke valve at the lower end of the tubing.

In the production of oil the lower end of the tubing is often equipped with a choke valve which may be controlled by manipulating the tubing. It is one of the objects of this invention to provide means for conveniently rotating the tubing to manipulate said valve while maintaining a seal between the tubing and the head proper to prevent the escape of the well fluid.

It is another object of the invention to provide in a tubing head, a novel type of tubing hanger mounted in the head in a novel manner so that the hanger and tubing may be rotated.

With the above and other objects in view the invention has particular relation to certain novel features of construction, operation and arrangement of parts, an example of which is given in this specification and illustrated in the accompanying drawing, wherein:

The figure shows a side elevation of the tubing head partly in section.

Referring now more particularly to the drawing, the numeral 1 designates a head attached to the upper end of a casing 2. The head has an inside downwardly tapering seat 3 and beneath the seat has the outflow lines 4, 4 which may be controlled by the conventional valves provided for the purpose. On the seat 3 there is a metal bushing 5 shaped to conform to the shape of the seat 3 and having external annular packing rings 6 countersunk therein to form a seal with the seat 3. Above the packing rings the bushing has an annular external V-groove 7 and extending radially through the upper end flange 8 of the head 1 there are the retaining bolts 9 whose inner ends have threaded connections with the head and beyond said connections have the inner tapering ends 10 which engage with the sloping underside of the groove 7 to secure the bushing in place. The outer ends of the bolts 9 are shaped to receive a wrench whereby they may be screwed inwardly into active position as shown or outwardly to clear the bushing to permit its removal or insertion. The bolts are surrounded by packing 11 retained in place by the gland 12.

The bushing 5 has an inside counter-bore forming the inside annular shoulder 13 near its lower end. Fitted through the bushing 5 there is the tubular hanger 14 to the lower end of which the tubing 15 is connected. The hanger has an external annular rib 15a and above and beneath said rib are the annular bearing assemblies 16, 17, the latter of which is supported on the shoulder 13 and the former of which is supported by said rib.

Within the counter-bore of the bushing and surrounding the hanger and supported on the upper antifriction bearing assembly 16 there is the packing 18 which is clamped in place by the gland 19. This gland is secured to the bushing by the clamp bolts 20. Effective sealing means is thus provided between the hanger and the bushing.

On the head 1 there is a housing 21 having the external lower end flange 22 and the flanges 8 and 22 are secured together by suitable clamp bolts 23 with a conventional gasket 24 between them. The upper end of the housing is inwardly thickened so as to closely surround the hanger 14 and the inwardly thickened portion is counter-bored from beneath to receive the annular packing 25 which closely surrounds the hanger and is clamped against the inside annular shoulder 26 of the housing by means of gland 27 which is bolted to the inwardly thickened upper end of the housing by the clamp bolts 28. Bolted on to the upper end of the housing there is a Christmas tree adapter 29 and between said adapter and housing there is a conventional gasket 30.

A chamber 31 is thus provided within the housing for the gearing hereinafter referred to.

Splined on the hanger within the chamber 31 there is a bevel gear 32 which is also secured against longitudinal movement by a set screw 33.

The housing has a laterally extended bearing 34 to receive the outwardly extended shaft 35. Keyed on the inner end of the shaft there is a pinion 36 which is in mesh with the bevel gear 32. A nut 37 is keyed on the inner end of the shaft 35 abutting said pinion by the cotter key 38 and the outer end of the pinion abuts against the inside wall of the housing. A collar 39 is secured on the shaft 35 by the set screw 40 and in abutting relation with the outer end of the bearing 34 whereby the shaft 35 is maintained against endwise movement.

The outer end of the shaft 35 is shaped to receive a wrench whereby said shaft and pinion may be turned to rotate the tubing hanger and tubing as may be required, while maintaining a seal between the hanger and tubing head.

What we claim is:

1. A tubing head for wells comprising a tubular head adapted to be connected to the top of a well casing and having an inside seat, a tubular bushing in sealed engagement with the seat, retractable means for securing the bushing in place, a tubular hanger extended through and rotatable in the bushing, sealing means between the hanger and bushing, a housing on the head to receive the hanger, sealing means between the housing and hanger, gearing in the housing operatively connected with the hanger and means accessible from without the housing, for operating the gearing and rotating the hanger and the tubing suspended therefrom.

2. A tubing head comprising a tubular head adapted to be connected to the top of a well casing and having an inside seat, tubing suspending means in sealed engagement with said seat and including a rotatable tubing hanger, a housing on the head inclosing a chamber and through which the hanger extends, means forming a seal between the hanger and housing, a gear on the hanger within said chamber, a pinion in the chamber in mesh with said gear and means for rotating the pinion to rotate the hanger and tubing.

3. In combination a tubular head adapted to be connected to a pipe in a well and having an inside seat, a tubular bushing on said seat, a tubular hanger extended through and rotatable in the bushing and adapted to be coupled to a well tubing, a support in the bushing, antifriction means for mounting the hanger in the bushing and mounted on said support, sealing means between the bushing and head, sealing means between the bushing and hanger, a housing on the head through which the hanger extends and containing a chamber, sealing means between the hanger and housing, means within the chamber connected with the hanger for rotating the same, and accessible means for driving said rotating means.

4. A tubing head for wells comprising a tubular head adapted to be connected to a pipe in a well and having an inside seat, tubing suspending means in sealed engagement with said seat and including a rotatable tubing hanger, a housing on the head through which the hanger extends and in sealed engagement with the hanger, gearing inclosed by the housing, means accessible outside of the head for driving the gearing and operatively connected with the hanger by means of said gearing whereby the hanger and tubing may be rotated.

ARTHUR J. PENICK.
KIRBY T. PENICK.